Nov. 8, 1966   J. W. PARRIS   3,284,803
SHUTTERS FOR OSCILLOGRAPH RECORDERS
Filed Sept. 16, 1964   2 Sheets-Sheet 1

INVENTOR.
JOE W. PARRIS
BY
Agent

Nov. 8, 1966    J. W. PARRIS    3,284,803

SHUTTERS FOR OSCILLOGRAPH RECORDERS

Filed Sept. 16, 1964    2 Sheets-Sheet 2

INVENTOR.
JOE W. PARRIS
BY George C. Sullivan
Agent

United States Patent Office 3,284,803
Patented Nov. 8, 1966

3,284,803
SHUTTERS FOR OSCILLOGRAPH RECORDERS
Joe W. Parris, Smyrna, Ga., assignor to Lockheed Aircraft Corporation, Burbank, Calif.
Filed Sept. 16, 1964, Ser. No. 396,965
8 Claims. (Cl. 346—109)

This invention relates in general to shutters and in particular to shutters for blocking the light output from selected galvanometers in an oscillograph recorder.

In the fields of measuring and testing, there is frequently a need for an apparatus which will make a permanent record of a number of variables. These variables, which may be in the form of electrical signals or which may be other variables transduced to electrical signals, commonly are supplied to a recorder of the oscillograph type. In such a recorder the voltage variations are converted to fluctuations in the position of a beam of light, and these fluctuations are recorded on a photosensitive paper. This paper frequently takes the form of a moving web so that continuous recording over a period of time may be had.

In oscillograph recorders of the galvanometer type, voltage variations are converted to fluctuations in the position of a beam of light by means of optical galvanometers. Generally, an optical galvanometer includes a small mirror attached to a small deflection coil. The coil and mirror assembly is housed in a pencil-shaped casing which is in turn mounted in a magnetic block. The galvanometer mirrors are aligned perpendicularly to the north-south polarity of the magnetic block. The voltage to be measured induces a current through the small deflection coil whereby the magnetic field of the block is opposed and movement of the coil results. The mirror, being attached to the coil, is also moved. The greater the current through the coil, the greater the movement of the mirror about the spin axis of the coil.

In a practical application of a galvanometer recorder, a plurality of optical galvanometers will be installed within a given magnetic block. Illumination from a common source will be supplied to all of these galvanometers. The light reflected from each of the individual galvanometer mirrors will be focused by suitable optical apparatus onto a particular portion of the photosensitive paper so that fluctuation of a given input voltage will cause light fluctuation only along a predetermined portion of the paper. In this manner, the light reflected from each of the plurality of optical galvanometers ideally oscillates over a separate portion of the width of the photosensitive paper so that all of these light outputs can be recorded simultaneously.

While an oscillograph recorder may have each of its optical galvanometers connected to a different portion of a system undergoing tests, it is frequently desired to record only selected ones of these inputs. Alternatively, it may occur that an oscillograph recorder having, for example, fifty record channels may be connected to a system having less than fifty test points. In either case, although no current passes through the deflection coils of the unused optical galvanometers, a stationary light trace still is reflected from the common light source onto the recording medium by these unused galvanometers. The unnecessary traces thereby produced on the recording medium are undesirable since they may result in cluttering of the medium and make interpretation of the recorded data more difficult. Furthermore, the presence on the recording medium of meaningless null traces limits the amplitude of variation which adjacent traces may undergo without interference from these null traces.

Many solutions have been proposed in an attempt to overcome the problem of the unwanted galvanometer traces. It has been suggested that the unused galvanometers be twisted in their mounting so that the light reflected from these galvanometers will not fall on the recording medium. This solution not only requires the individual attention of a technician to each unused galvanometer before each recording run, but also necessitates tedious and time-consuming realignment of the galvanometers thus twisted after the recording run. Additionally, since the optical galvanometers are by nature sensitive and delicate instruments, damage to them frequently results from such twisting and realigning. Another proposed solution—that of completely removing from the magnetic block those galvanometers to be unused—suffer from the same disadvantages. Solutions such as that of sticking a piece of opaque tape over the galvanometer mirror also require the detailed attention of a technician before and after the recording run in addition to being, at best, makeshift solutions.

It has been proposed to equip such recorders with a plurality of masks or shutters so that the light going to each individual galvanometer can selectively be blocked from that galvanometer. While this has more merit than any of the foregoing proposals, it still suffers from the fact that an operator must before each recording run position certain of these shutters and after the recording run reposition the shutters. Once positioned, the shutters cannot be repositioned without physical access to the recorder and probable disturbance of any recording in progress. In addition to being tedious and time-consuming, this latter proposal simply is not practical where the recorder may be inaccessibly mounted, for example, in an airplane.

These problems are solved according to the invention disclosed herein by the provision of a plurality of shutter elements each of which is resiliently maintained in non-blocking position. Situated adjacent these shutters are one or more movable actuating bars to which may be attached means for permitting any combination of the shutters to be selectively positioned so as to block the light going to their respective galvanometers. Positioning of the bar causes the selected shutters to be moved into either a blocking or a non-blocking position. Several such bars may be provided with each bar being set up to actuate a different combination of shutters. Positioning of these bars may be accomplished by an operator located at a position remote of the recorder.

Accordingly, it is an object of this invention to provide an improved apparatus for controlling the light supplied to an optical galvanometer.

It is another object of this invention to provide an improved shutter arrangement for an oscillograph recorder wherein only a selected set of traces will be recorded.

A further object of this invention is to provide an improved shutter arrangement for an oscilluograph recorder wherein only selected sets of traces will be recorded.

A still further object of this invention is to provide an improved apparatus for an oscillograph recorder whereby there will be eliminated the recording of traces from unused galvanometers.

Still another object of this invention is to provide an improved arrangement whereby selected galvanometers in an oscillograph recorder can be rendered nonfunctional easily and without resort to physical contact with the galvanometers.

It is a further object of this invention to provide an improved shutter arrangement for use with an optical galvanometer.

A still further object of this invention is to provide an improved shutter arrangement for use with oscillograph recorders of the galvanometer type.

Yet another object of this invention is to provide an improved shutter arrangement to permit light to strike only selected galvanometers of an oscillograph recorder.

The exact nature of this invention as well as other objects and advantages thereof will be readily apparent from consideration of the following specification relating to the annexed drawings in which.

Figure 1:
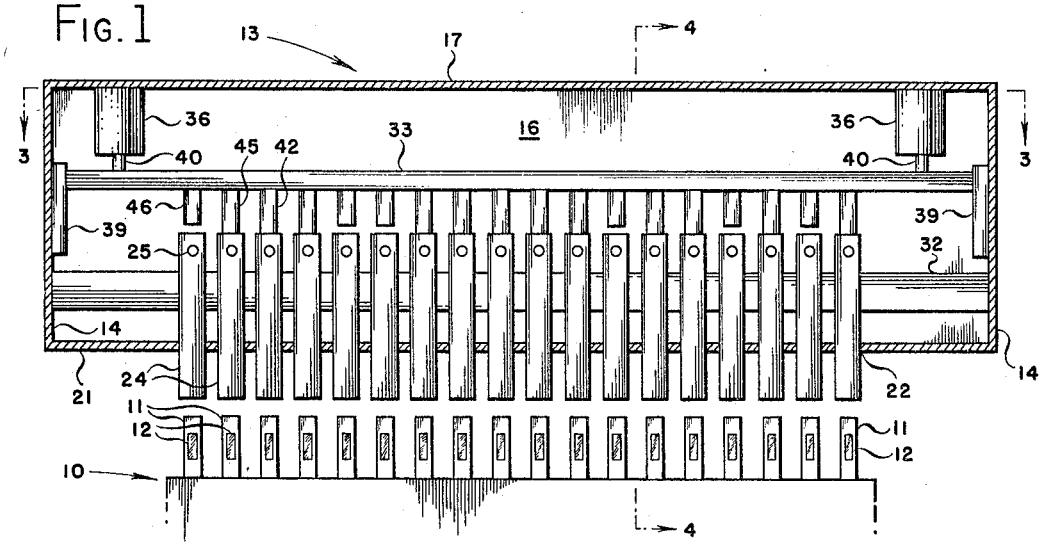
FIGURE 1 shows an elevation view of an embodiment of the invention in partial section.

The embodiment of this invention depicted in the drawings may briefly be described as including an individual shutter member for each of the optical galvanometers of a recorder. These shutters are disposed in front of their respective galvanometers and are maintained by individual spring means in a position permitting light to strike and be reflected from the galvanometers. An actuating bar is disposed above and in transverse relation to the springs. In each intervening space between the actuating bar and each of the springs, there may be inserted a driving rod which projects downwardly from the actuating bar toward the spring. When the actuating bar is caused to move downwardly, the driving rods that have been inserted in the actuating bar strike the respective springs and depress them, causing only those shutters associated with these springs to be lowered in front of their respective galvanometers. This blocks the light reaching these galvanometers and thus removes from the recording medium any trace that would have been caused by these galvanometers. When the actuating bar is moved upwardly, the shutters are removed from their light blocking position by the springs.

Turning now to the drawings for a more detailed description of this embodiment of the invention, there is shown in FIGURE 1 a galvanometer block 10 having a plurality of optical galvanometers 11 disposed therein. Each of galvanometers 11 includes a small mirror 12 which is caused to rotate along the axis of the galvanometer when a signal current is received by that galvanometer. Mirror 12 is illuminated by a light source (not shown) and the light reflected from the mirror is directed by means of a suitable optical system onto a photosensitive recording medium.

Figures 4, 5:
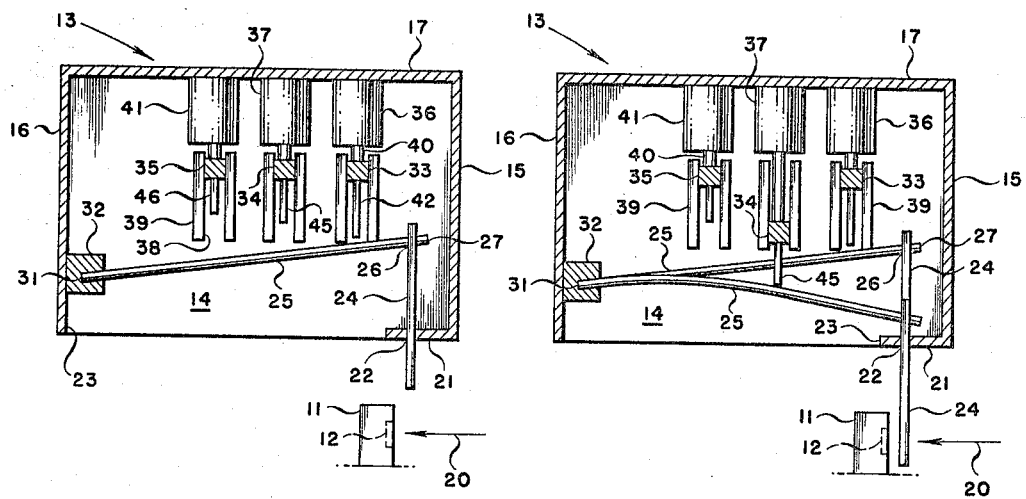
FIGURE 4 shows a section view taken along lines 4—4 of FIGURE 1.
FIGURE 5 shows a section view taken along lines 5—5 of FIGURE 2.

Disposed above the galvanometer block and its associated galvanometers is a shutter mounting frame indicated generally at 13. This frame includes end panels 14, a front panel 15, a back panel 16, and a top panel 17. The bottom portion of the shutter mounting frame is left substantially open as at 23, with the exception of shutter mounting portion 21. As shown in FIGURES 4 and 5, shutter mounting portion 21 contains a plurality of openings 22.

Slidably disposed in each of openings 22 is a shutter 24. These shutters, the movement of which is guided by their passage through opening 22, are capable of being moved into an upward position shown in FIGURE 5, in which the shutter is not blocking the light received by mirror 12, or into a lower position also shown in FIGURE 5 in which the shutter is blocking the light received by mirror 12. Although the shutters are shown in the drawing as having a rectangular cross section the actual shape of the shutters is not critical, the important consideration being that when the shutter is in the lowered position light shall be blocked from the mirror of the galvanometer associated with that shutter.

Each of the shutters 24 is normally retained in an upward position by means of spring 25, there being an individual such spring for each shutter. As best illustrated in FIGURES 4 and 5, each of springs 25 is retained cantilever-fashion at an end 31 by spring holder 32. The other end 27 of the spring passes through an opening 26 contained in the upper end of shutter 24.

Figure 3:
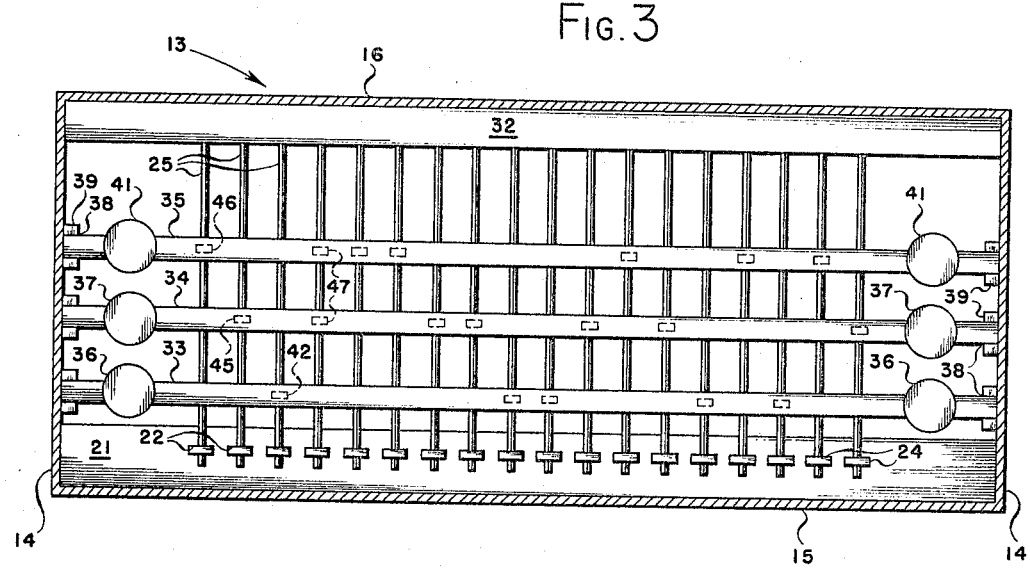
FIGURE 3 shows a section view taken along lines 3—3 of FIGURE 1.

Contained above the springs and oriented transversely thereto is actuating bar 33. As best seen in FIGURE 3, actuating bar 33 is slidably retained in slots 38 formed by mounting blocks 39. Solenoids 36 are disposed above actuating bar 33 adjacent both ends thereof. The actuating plungers 40 on solenoids 36 are connected to actuating bar 33 so that when these solenoids are energized actuating bar 33 will be driven downwardly a predetermined distance. Movement of bar 33 will be guided by slots 38.

It will be seen that there are a number of driving rods 42 depending from actuating bar 33. Each of the driving rods 42 is positioned directly above a particular spring 25. Driving rods 42 may be fastened to actuating bar 33 in any desired manner such as, for example, by means of tapped bores in the under side of the actuating bar into which threaded ends of the driving rods are received. An alternative example is the provision of a plurality of driving rods slidably disposed on the actuating bar so that the driving rods can be slidably positioned above the particular springs. Since the driving rods will be attached to the actuating bar to select the particular shutters to be lowered, the mounting means should be chosen to permit the driving rods to be easily positioned at the proper points on the actuating bar.

The shutter control mechanism need not be limited to a single actuating bar. As seen in FIGURES 3, 4 and 5, a second actuating bar 34 and a third actuating bar 35 have also been provided, each of the actuating bars being equipped with solenoids 37 and 41, respectively. Actuating bars 34 and 35 may also be equipped with a plurality of driving rods 45 and 46, respectively, these driving rods performing the same function as driving rods 42 and being attached to their respective actuating bars in a similar fashion.

In describing the operation of this invention, it will be assumed that the operator has connected the galvanometers of the oscillograph recorder in such a manner that only certain of the galvanometers will be receiving a signal at predetermined times. The operator will thus wish to have shutters lowered over those galvanometers at such times. To accomplish this, driving rods 42 will be inserted in actuating bar 33 directly above those springs 25 which are associated with the shutters it is desired to lower. Of course, this setup will be accomplished before the actual recording operation begins. If the operator wishes to block the light from different sets of galvanometers at different times, actuating bars 34 and 35 will be similarly equipped with the desired combination of driving rods. Any shutter may be actuated by two or more actuating bars simply by equipping the actuating bars with suitable driving rods as shown at 47. This shutter will be in blocking position as long as at least one of actuating bars 34 and 35 is in lowered position.

Figure 2:
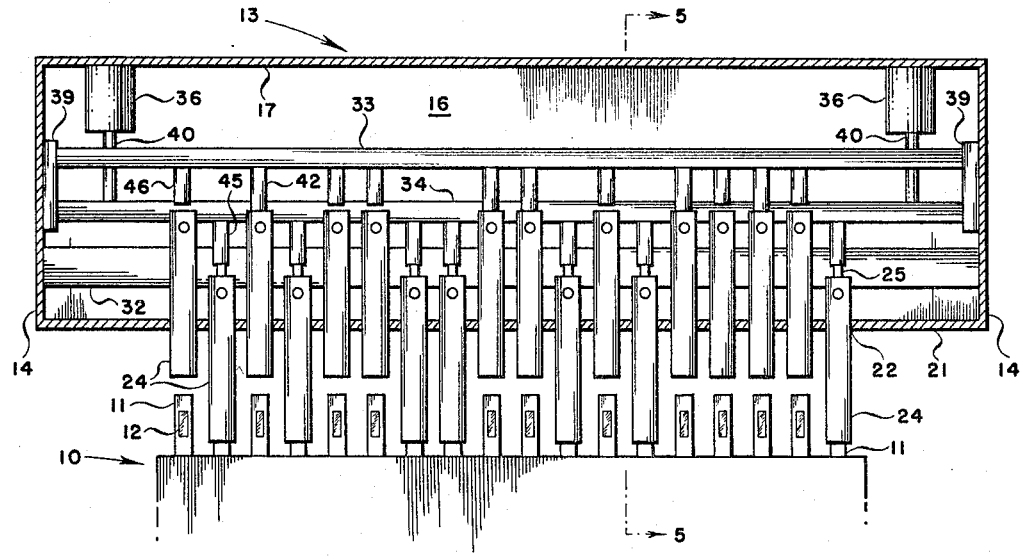
FIGURE 2 shows an elevation view of the embodiment of FIGURE 1 with some of the shutters in operative position.

When the galvanometers thus selected are to be blocked, the solenoids associated with a particular actuating bar, for example bar 34, will be energized whereby this bar will be lowered in slots 38. Driving rods 45 attached to actuating bar 34 will contact certain ones of springs 25 whereby, as shown in FIGURES 2 and 5, the shutters 24 associated with these springs will be lowered to block the light from the preselected galvanometers. Actuating bars 33 and 35, and any others that might be present, will function in a similar manner. The appropriate solenoids may be energized either directly by the operator or indirectly through the selection of a particular recording mode which will automatically cause the proper solenoids to be energized.

Because the various actuating bars 33, 34 and 35 are located at differing distances from the effective fulcrum point of springs 25, the extent of reciprocating motion of these bars, their position with respect to springs 25, and the dimensions of driving rods 42, 45 and 46 should be so chosen that downward motion of any one of the actuating bars will cause the same amount of downward movement of the shutter. Because the ends 27 of springs 25 move in an arc, the connection of the springs in slots 26 should permit relative movement of the springs within these slots.

From the foregoing, it will be seen that there has been disclosed and described a shutter arrangement which contains none of the shortcomings of the prior art devices and which substantially enhances the flexibility of galvanometer oscillograph recorders. The shutter arrangement of this invention can be quickly and easily set up to block selected galvanometers without the need either of attaching something to the particular galvanometer or of affecting the alignment of those galvanometers. A plurality of such differing blocking arrangements can be preset into the recorder; this feature of presetting enables the actual recording operation to be taken without the need of interruption to insert blocking means at that point. Where the recorder is inaccessible to the operator at the time selection of blocking is desired, the invention nonetheless permits any one of several preselected blocking arrangements to be chosen at that time. These operational advantages of the invention disclosed herein enable the recorder to produce an output record that is devoid of meaningless and confusing extraneous traces.

It should be understood, of course, that the foregoing disclosure relates only to a preferred embodiment of the invention and that numerous modifications or alterations may be made therein without departing from the spirit and the scope of the invention as set forth in the appended claims.

What is claimed is:

1. For use in an oscillograph recorder of the type employing a number of optical galvanometers, apparatus comprising:
   a shutter for each of a plurality of the optical galvanometers in the recorder, each of said shutters being individually movable to a first position in which the light path to the optical galvanometer with which that shutter is associated is not blocked and to a second position in which said light path is blocked;
   retaining means operatively associated with each of said shutters to retain said shutters normally in said first position;
   actuating means selectively movable into a first position or into a second position relative to said retaining means; and
   preselecting means connected to said actuating means, said preselecting means causing certain of said retaining means to be displaced to cause the shutter means associated with said certain retaining means to be moved to said second position when said actuating means is moved to its said second position.

2. For use in an oscillograph recorder of the type employing a number of optical galvanometers, apparatus comprising:
   a shutter for each of said optical galvanometers, each of said shutters being individually movable to a first position in which the light path to the optical galvanometer with which that shutter is associated is not blocked and to a second position in which said light path is blocked;
   retaining means connected to each of said shutters so that said shutters are normally retained in said first position;
   at least one actuating member disposed adjacent said retaining means, said actuating member being selectively movable to a first position and a second position relative to said retaining means; and
   preselecting means removably attached to said actuating member, said preselecting means being positioned with respect to said retaining means so that when said actuating member is in its first position said shutters are retained in the first position and when said actuating member is moved to its second position said preselecting means displaces selected ones of said retaining means whereby the shutters to which said selected retaining means are connected will be moved to their second position.

3. For use with an oscillograph recorder of the type employing a number of optical galvanometers, apparatus comprising:
   shutter means disposed adjacent the light paths of said galvanometers, said shutter means being capable of being placed in light-blocking relationship with respect to said light paths;
   resilient means connected to said shutter means to maintain said shutter means in a position in which said light paths are not blocked;
   actuating means selectively movable into a first position or into a second position relative to said resilient means; and
   preselecting means connected to said actuating means, said preselecting means causing certain of said resilient means to be yieldingly displaced to cause said shutter means to be placed in light-blocking relationship when said actuating means is moved to its second position.

4. For use with an oscillograph recorder of the type employing a number of optical galvanometers, apparatus comprising:
   a shutter for each of said optical galvanometers, each of said shutters being individually movable to a first position in which the light path to the optical galvanometer with which that shutter is associated is not blocked and to a second position in which said light path is blocked;
   a separate resilient member connected to each of said shutters so that said shutters are normally retained in the first position;
   an actuating member disposed adjacent said resilient member, said actuating member being movable to a first position and a second position;
   preselecting means removably attached to said actuating member at a point thereon adjacent selected ones of said resilient members connected to those shutters to be moved to said second position, said preselecting means being disposed with respect to said selected resilient members so that when said actuating member is in its first position said preselecting means permits said selected resilient members to retain their respective shutters in said first position and when said actuating member is in its second position said preselecting means are moved into engagement with said selected resilient members whereby the shutters to which those resilient members are connected are moved to said second position.

5. For use with an oscillograph recorder of the type employing a number of optical galvanometers, apparatus comprising:
   a shutter for each of said optical galvanometers, each shutter being movable to a first position in which the light path to the optical galvanometer with which that shutter is associated is not blocked and to a second position in which said light path is blocked;
   a separate spring connected to each of said shutters so that said shutters are normally retained in the first position;
   at least one actuating member disposed adjacent said spring substantially transversely thereto, said actuating member being movable to a first position and a second position;
   at least one driving rod removably received on said actuating member to engage a desired one of said springs when said actuating member is moved to its second position.

6. Shutter apparatus for use with optical galvanometers, comprising:
- a housing including a front portion, a back portion, and a pair of end portions joining said front and back portions, the housing being disposed adjacent said optical galvanometers in substantial alignment therewith;
- a shutter mounting member connected with said front portion, said shutter mounting member having therein a separate shutter guide opening corresponding to each of said galvanometers;
- a shutter member received in each of said shutter guide openings and guided thereby so as to be capable of substantially reciprocatory movement into a first position wherein the optical path of the galvanometer associated with the shutter member is not blocked and into a second position wherein said optical path is blocked;
- a spring connected to each of said shutter members to retain said shutter members in said first position;
- at least one actuating member supported within said housing for limited reciprocal movement between a first position and a second position, said actuating member extending substantially transversely of said springs;
- motion producing means connected to said actuating member for causing reciprocation thereof; and
- at least one driving rod removably attached to said actuating member so as to engage a selected one of said springs when said actuating member is moved from its first position to its second position by said motion producing means, whereby the shutter member to which said selected spring is connected will be moved into its second position.

7. Apparatus as in claim 6, wherein:
said springs are of the cantilever type having one end fixedly attached to said housing and the other end engaging said shutter member.

8. Apparatus as in claim 7, wherein:
said actuating member is above said spring and is capable of substantially vertical component of motion, said driving rod being attached to said actuating member to project downwardly therefrom toward said selected spring, whereby downward movement of said actuating member causes said driving rods to engage and deflect said selected springs.

References Cited by the Examiner

UNITED STATES PATENTS

| 2,721,783 | 10/1955 | Higbee et al. | 346—145 |
| 2,791,483 | 5/1957 | Adams | 346—145 |
| 3,200,405 | 8/1965 | Kampf | 346—109 |

OTHER REFERENCES

Nassimbene E. G., Light Shutter. IBM Technical Disclosure Bulletin, vol. 7, No. 1, June 1964 page 70.

RICHARD B. WILKINSON, *Primary Examiner.*

LOUIS J. CAPOZI, *Examiner.*

J. W. HARTARY, *Assistant Examiner.*